US012282149B2

(12) United States Patent
Horstmeyer et al.

(10) Patent No.: US 12,282,149 B2
(45) Date of Patent: Apr. 22, 2025

(54) MULTIPLE CAMERA MICROSCOPE IMAGING WITH PATTERNED ILLUMINATION

(71) Applicant: Ramona Optics Inc., Durham, NC (US)

(72) Inventors: Roarke Horstmeyer, Palo Alto, CA (US); Robert Horstmeyer, Palo Alto, CA (US); Mark Harfouche, Pasadena, CA (US)

(*) Notice: Subject to any disclaimer, the term of this patent is extended or adjusted under 35 U.S.C. 154(b) by 115 days.

(21) Appl. No.: 18/079,226

(22) Filed: Dec. 12, 2022

(65) Prior Publication Data

US 2023/0106701 A1    Apr. 6, 2023

Related U.S. Application Data

(63) Continuation of application No. 17/228,121, filed on Apr. 12, 2021, now Pat. No. 11,525,997, which is a continuation of application No. 16/066,065, filed as application No. PCT/US2017/024610 on Mar. 28, 2017, now Pat. No. 10,976,535.

(60) Provisional application No. 62/315,037, filed on Mar. 30, 2016.

(51) Int. Cl.
| | |
|---|---|
| G02B 21/06 | (2006.01) |
| G02B 21/36 | (2006.01) |
| H04N 23/56 | (2023.01) |
| H04N 23/80 | (2023.01) |
| H04N 23/90 | (2023.01) |
| G01N 21/64 | (2006.01) |

(52) U.S. Cl.
CPC .......... *G02B 21/367* (2013.01); *G02B 21/06* (2013.01); *H04N 23/56* (2023.01); *H04N 23/80* (2023.01); *H04N 23/90* (2023.01); *G01N 21/6458* (2013.01)

(58) Field of Classification Search
None
See application file for complete search history.

(56) References Cited

U.S. PATENT DOCUMENTS

| | | | |
|---|---|---|---|
| 2013/0242060 A1* | 9/2013 | Brady | H04N 13/204 348/47 |
| 2014/0176710 A1* | 6/2014 | Brady | H04N 5/2624 348/144 |
| 2015/0192529 A1* | 7/2015 | Sato | G01N 21/4738 438/16 |

* cited by examiner

*Primary Examiner* — Christopher G Findley

(57) ABSTRACT

An array of more than one digital micro-camera, along with the use of patterned illumination and a digital post-processing operation, jointly create a multi-camera patterned illumination (MCPI) microscope. Each micro-camera includes its own unique lens system and detector. The field-over-view of each micro-camera unit at least partially overlaps with the field-of-view of one or more other micro-camera units within the array. The entire field-of-view of a sample of interest is imaged by the entire array of micro-cameras in a single snapshot. In addition, the MCPI system uses patterned optical illumination to improve its effective resolution. The MCPI system captures one or more images as the patterned optical illumination changes its distribution across space and/or angle at the sample. Then, the MCPI system digitally combines the acquired image sequence using a unique post-processing algorithm.

20 Claims, 8 Drawing Sheets

| Camera parameter | Variable | Value |
| --- | --- | --- |
| Lens focal length | f | 15 mm |
| Lens working distance | $d_l$ | 100 mm |
| Pupil-sensor distance | h | 18 mm |
| Lens pupil diameter | k | 6 mm |
| Magnification | M | 0.18 |
| Effective NA | NA | 0.04 |
| PSF width (incoh./coh.) | PSF | 4.8 μm/9.6 μm |
| Sensor pixel size | $\partial$ | 1.4 μm |
| Number of pixels | MP | 4320 x 2432 (10 MP) |
| Sensor width | s | 6.1 mm x 4.6 mm |
| Camera width | c | 12 mm x 9 mm |
| Inter-camera distance | y | 15 mm x 12 mm |
| Field of view | FOV | 33 mm x 25 mm |
| Field of view overlap | P | 9 mm x 6.5 mm |

TABLE I

FIG. 10

| M-C array parameter | Variable | Value |
| --- | --- | --- |
| LED array distance | $d_i$ | 60 mm |
| Number of LEDs | [1] | 225 |
| LED center wavelength | λ | 632 nm |
| LED active area diameter | [2] | 150 μm |
| Number of micro-cameras | N | 8x8=64 |
| Total FOV | tFOV | 138 mm x 111 cm |

TABLE II

FIG. 11

MULTIPLE CAMERA MICROSCOPE IMAGING WITH PATTERNED ILLUMINATION

The present patent application is a continuation of U.S. application Ser. No. 17/228,121, filed on Apr. 12, 2021, now U.S. Pat. No. 11,525,997, which is a continuation of U.S. application Ser. No. 16/066,065, filed on Jun. 26, 2018, now U.S. Pat. No. 10,976,535, which claims priority from International application PCT/US2017/024610 filed on Mar. 28, 2017, which claims priority from U.S. Provisional application 62/315,037, filed on Mar. 30, 2016, all of which are herein incorporated by reference in their entirety.

TECHNICAL FIELD

This invention relates to a microscope system that reconstructs images using multiple cameras, patterned illumination and computational post-processing.

BACKGROUND ART

Current microscopes exhibit a tradeoff between their resolution and field-of-view (FOV). To image across a larger FOV, one is typically forced to design a microscope objective lens that offers a poorer resolution. Due to this tradeoff, most standard microscopes are only able to capture a maximum of 50 million resolvable spots (i.e., 50 megapixels) per image. This invention relates to a microscope that overcomes the above limit by simultaneously offering a high resolution over a large FOV.

There are a number of current devices and methods that also attempt to address the resolution versus FOV tradeoff in optical microscopes. The most common strategy is to use a standard microscope objective lens, selected for a particular resolution, along with a mechanical translation stage to sequentially shift the sample through the limited FOV of the objective lens over time. This type of device is often used in whole slide imaging. A well-known example is the Aperio system from Leica, which can image a 15×15 mm FOV at approximately 0.65 µm resolution (i.e., comparable to a 20× objective) in one minute (one of the fastest on the market currently) [Ref NPL1]. An example used in optical metrology is the ODIN microscope from HSEB-Dresden, which can image a 300 mm diameter wafer at ~1 µm resolution in slightly less than a minute [Ref NPL2].

To speed up the image acquisition process, one can instead increase the design complexity of a single objective lens to increase the lens FOV for a fixed resolution goal. This is often the case in lithography, where such wide FOV, high-resolution lenses can contain over 30 elements and cost several million dollars or more (see for example patent reference [Ref PTL1] from Cal Zeiss, or [Ref PTL2] from Nikon, or any of the other related large patented lens designs). These lithography lenses are able to maintain an NA of 0.8 (or above) over a FOV up to 100 mm across, but often occupy up to a cubic meter of space and must be designed and mounted in a customized manner.

To relax the size, weight, complexity and cost of such large lenses, previous work has added an adaptive scanning mirror behind a less complicated lens system, which multiplexes a larger FOV onto a single sensor by imaging over time [Ref NPL3]. Alternatively, one can shift to a multi-lens design, the simplest being the use of multiple standard objective lenses in parallel [Ref NPL4]. However, this type of approach does not attempt to image a contiguous FOV, but instead just multiple narrow segments of the sample of interest, as with other alternative designs [Ref PTL3-Ref PTL6].

The same principle has also been created in a miniaturized form, using arrays of microlenses for fluorescence imaging [Ref NPL5, Ref NPL6], as well as with an array of Fresnel zone plates [Ref NPL7]. An entire FOV has been imaged onto a single detector using an array of 800 large microlenses, which offers a significant speedup for whole-slide imaging [Ref NPL8]. However, the FOV of the arrangement in [Ref NPL8] remains limited to the size of the utilized digital detector at the focal plane, which is still relatively small (no more than 100 mm across, and often less with smaller pixels). A unique property of the present micro-camera array invention described here is that it can scale to an arbitrarily wide FOV by simply adding more camera modules, and utilize arbitrarily small (and inexpensive) focal plane detector arrays. Finally, camera array designs have been used to acquire light field datasets within a microscope [Ref NPL9]. However, such approaches offer a resolution and FOV that is still limited to that defined by the main objective lens.

The present invention, termed a multi-camera patterned illumination (MCPI) microscope, can capture a contiguous wide-FOV image with microscope-scale resolution in a single snapshot. This is the "standard" mode of MCPI operation. In addition, the MCPI system may improve the resolution performance of each camera module by shining patterned illumination onto the sample. This is the "high-resolution" mode of MCPI operation. There are many microscopes that illuminate a sample with patterned illumination while capturing one or more images. Examples include both dark-field and structured illumination microscopes. However, no designs besides the MCPI microscope use multiple micro-cameras to capture light from the same sample area (i.e., capture overlapping FOV's) while at the same time providing patterned illumination.

Previous work has also considered how to improve the resolution of a microscope by capturing more than one image [Ref NPL10]. However, this prior work operates within a standard microscope using a single objective lens while capturing n different images over time. For each of the images, a unique set of one or more LEDs are illuminated within an LED array, which can either be located above or below the sample of interest. Similar prior work also reconstructed a 3D image of a thick sample using n uniquely illuminated microscope images [Ref NPL11], or simultaneously provides patterned illumination from more than once source [Ref NPL12, NPL13].

Recently, a technique has been proposed to improve resolution using an array of cameras [Ref NPL14]. With n cameras in the array, this design can in principle simultaneously capture n unique regions of the sample spectrum (i.e., the Fourier transform of the sample's amplitude and phase transmittance, if the sample is thin). However, these regions will not overlap in the Fourier domain, as required by certain methods for successful algorithm convergence [Ref NPL10]. Furthermore, the prior art is designed for far field macroscopic imaging (of objects multiple meters to kilometers away), is not amenable to a configuration for microscope imaging, requires highly coherent resolution (e.g. from a laser and not from LEDs), and also does not attempt 3D image reconstruction. A second recent experiment has attempted to use an array of lenses and sensors and a short working distance [Ref NPL15] to improve resolution. However, this work also considers the case of a highly coherent source that would spread the spectrum evenly across all of the cameras in the array, and this design does not consider cameras with overlapping FOVs. A third recent experiment [REF US Patent App. 2016503a] uses multiple cameras and LED illumination to improve the resolution of images of each well within a well plate, but this prior art considers each camera and well individually. It does not attempt to image a contiguous FOV, and is thus not applicable to generally unaligned samples. Furthermore, this prior art does not use micro-cameras that offer overlapping FOVs, and thus cannot combine the image data from more than one camera to improve the resolution at one sample plane location, as is achieved in the current invention.

There are also other methods to use patterned illumination and computational post-processing to improve fluorescent image resolution, as for example outlined in [Ref NPL16]. However, to the best of our knowledge, this prior work has only been demonstrated in optical systems that contain a single microscope objective lens and capture a single image FOV. It has not been performed in a multiple camera system like this invention.

SUMMARY OF INVENTION

Technical Problem

As noted above, most current microscope platforms rely on a single microscope objective lens for image formation and are often in a large form-factor to accommodate a human viewer. Due to presence of lens aberrations, it is challenging to design a single microscope objective lens to simultaneously offer high resolution over a wide FOV. For example, most commercially available objective lenses with an NA of 0.8 (approximately 600 nm resolution, defined as the cutoff periodicity of an grating imaged with $\lambda=500$ nm coherent illumination) have a 0.5 mm diameter FOV (e.g., a 40× objective lens). Likewise, objective lenses with a FOV of approximately 1 cm offer a cutoff resolution of approximately 5 μm (e.g., a 2× objective lens), which is around a 10 lower resolution than the 0.5 mm FOV lens.

As the effect of lens aberrations increase proportional to the lens diameter and the image FOV, additional optical surfaces are typically added to a given lens system to offer some optical correction within the design [Ref NPL17]. However, this comes at the expense of lens system size, cost, and complexity. Instead of scaling the size of a single lens, an alternative strategy is to use multiple lenses, which are each attached to their own unique sensor at the focal plane (e.g., an array of micro-cameras). Given M micro-cameras within an array, the width of each camera lens can be M times smaller than a single lens offering the same FOV, and thus the effect of aberrations within each micro-camera will be M times less. The micro-camera array imaging strategy has been investigated in the past for macroscopic imaging [Ref NPL18-Ref NPL20] as well as a unique multiscale architecture for imaging objects located near infinity [Ref NPL21, Ref NPL22]. However, it is typically challenging to reach high resolutions with a micro-camera array arrangement, due to the geometric constraint that the magnification of each micro-camera placed in array cannot exceed unity.

Solution to Problem

The current MCPI invention uses an array of micro-cameras and a patterned illumination source for microscopic imaging. Its optical detection system contains more than one micro-camera, positioned in an array, to image partially overlapping FOVs of a sample. In the standard MCPI mode, one image from each micro-camera may be combined together to create a large FOV image at standard resolution. The MCPI microscope also contains a source of patterned illumination, which may shine light on the sample from a plurality of angles and/or in a particular spatial pattern, such that the spatial-angular distribution of light reaching the sample changes over time. In the "high-resolution MCPI mode, each micro-camera may then acquire a unique image for each illumination pattern. A post-processing algorithm may then combine the acquired set of images from any or all of the micro-cameras and for any or all of the illumination patterns into a high-resolution image reconstruction of the sample. The high-resolution reconstruction may also offer a measure of sample depth, spectral (i.e., color) properties, and/or the optical phase at the sample plane.

Advantageous Effects of Invention

The MCPI imaging system may achieve an image resolution of approximately 3-15 μm in a single snapshot (i.e., in "standard" mode after each micro-camera acquires one image). The FOV of the MCPI system grows linearly with the number of micro-cameras included in the array. For example, if the FOV of one camera is 1.25×1.25 cm, then an approximately 10×10 cm FOV is possible with 8×8=64 micro-cameras, and a 20×20 cm FOV is possible with 16×16=256 micro-cameras. In one preferred embodiment, the FOV of each micro-camera in the array at least partially overlaps with one or more other micro-cameras. With this overlap, it is possible to determine the height profile (i.e., distance along the optical axis) of a sample of interest using standard stereoscopic imaging methods.

In addition, in the high-resolution mode of operation, each micro-camera in the presented system may acquire more than one image, where a patterned illumination source changes the angle and/or spatial distribution of illuminating light at the sample plane between each captured image. In one preferred embodiment, we show how it is possible to improve the resolution of the final image reconstruction beyond that defined by the diffraction limit of its imaging lenses, by up to a factor of 5 or more in either dimension (e.g. from 5 μm to 1 μm or less) using a patterned illumination and post-processing strategy. In a second preferred embodiment, the MCPI system can improve the final image reconstruction beyond that defined by the diffraction limit of the imaging lenses and also measure the height profile of the sample at a multitude of spatial locations. In a third preferred embodiment, MCPI system can improve the final image reconstruction beyond that defined by the diffraction limit of the imaging lenses and also measure the optical phase of the sample. In a fourth preferred embodiment, the MCPI system can also measure and remove the aberrations within the imaging lenses [Ref NPL23], and/or measure the spectral (i.e., color) properties of a sample.

Finally, the MCPI system also offers a size/weight/complexity/cost advantage with respect to standard microscopes. It does not require any moving parts, its micro-cameras fit within a compact space, it does not require a rigid support structure and can thus operate within a small, confined space.

BRIEF DESCRIPTION OF DRAWINGS

FIG. 10 is a table of a preferred embodiment of the present micro-camera patterned illumination microscope invention showing example array parameters.

FIG. 11 is a table of a preferred embodiment of the present micro-camera patterned illumination microscope invention showing example micro-camera unit parameters.

DESCRIPTION OF EMBODIMENTS

Figure 1:
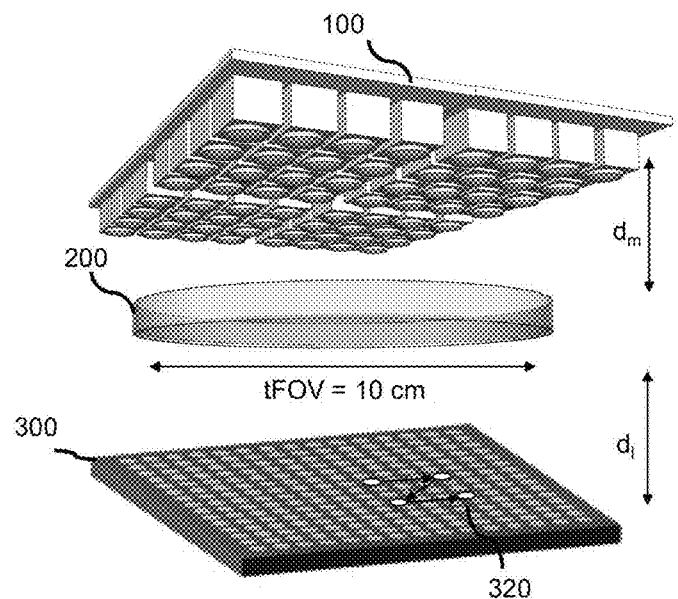
FIG. 1 is a top-and-side view of an embodiment of the present micro-camera patterned illumination microscope invention.

General arrangement of the MCPI microscope: A diagram of one preferred embodiment of an MCPI microscope is shown in FIG. 1, which includes a sketch of the micro-camera array [100], an example semi-transparent sample [200] and a patterned illumination source [300]. Here, the patterned illumination source is an array of more than one light sources [320] positioned beneath the sample. The light from a group of light sources in [320] can be turned on for standard MCPI mode, and this group can be scanned/varied while acquiring a sequence of images in the high-resolution operation mode. We discuss details of the preferred embodiment of each micro-camera and the patterned illumination sources in later sections.

Figure 2:
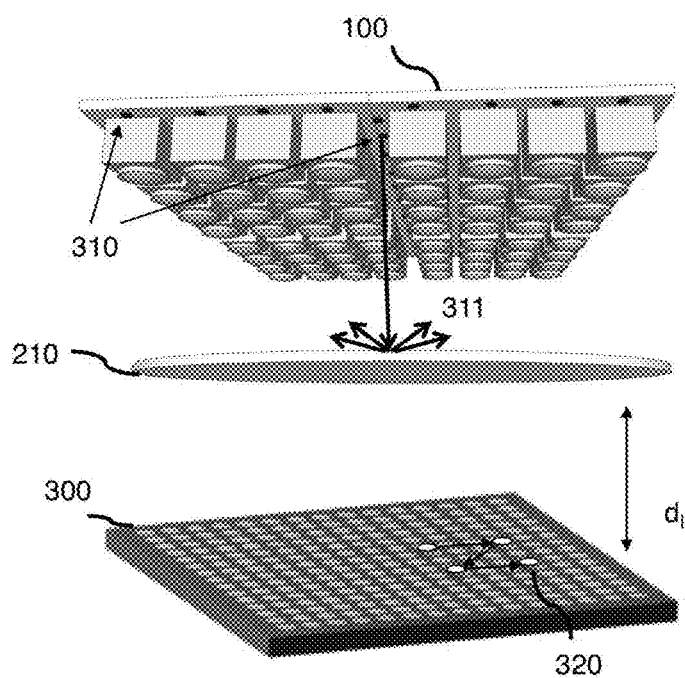
FIG. 2 is a second top-and-side view of an embodiment of the present micro-camera patterned illumination microscope invention.

FIG. 2 shows a second preferred embodiment of an MCPI microscope that can use both transmission illumination [300] and reflection illumination [310] (dual illumination). Here, the patterned illumination source may be located both below and above a sample, and more than one LED can illuminate the sample from both below [320] and above [310]. The dual illumination geometry will work best with samples that are both partially reflective and transparent, as in certain types of semiconductor wafer [210]. Both proposed geometries may follow the same principles and processing steps as outlined next for MCPI imaging, so we can consider them as effectively the same, apart from the exact location of the patterned illumination source with respect to the sample along the optical axis.

Figure 3:
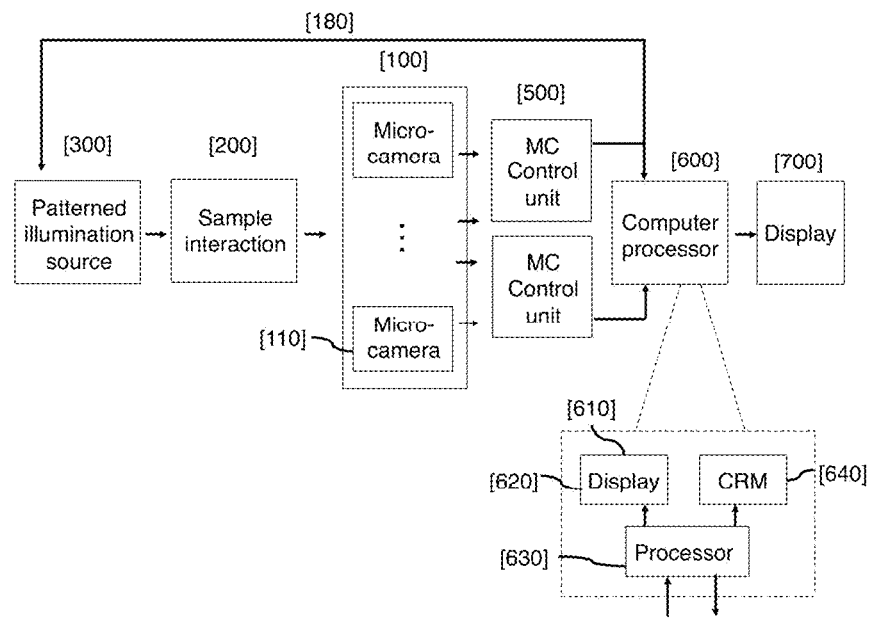
FIG. 3 is a component diagram of an embodiment of the present micro-camera patterned illumination microscope invention.

The general workflow of the MCPI setup is shown in FIG. 3. It should be read in general terms and not for a specific geometry of hardware, as it is well known that micro-cameras, processors, control units and computer processor elements can be collocated physically or can be distributed and these geometric relationships are dynamic as production volumes, costs and chip design feature sizes change over time. When light from the patterned illumination source in [300] reaches and interacts with the sample of interest (i.e., can be absorbed or scattered from the sample, for example) [200], then the light exiting the sample carries information about the sample to the micro-camera array [100]. The micro-camera array contains more than one micro-camera [110]. For operation in transmission mode, the micro-cameras may be mounted in a periodic rectangular array. For the proposed invention, the mount can either be flat with respect to the sample surface, or curved into a hemispherical shape as it is in [Ref. NPL21].

After each micro-camera captures a digital image, the image data can then be passed to a set of electronic micro-camera (MC) control units [500], which may provide logic and local memory for each micro-camera. It is common knowledge that the processor of each control unit may be embedded on the same chip as a digital detector, or may be included as a separate chip or circuit. Each MC unit can then pass the image data to a computer processor [600], which can contain a display [610], processor [620] and a computer readable medium [630]. The computer processor may also control the patterned illumination source. The MCPI microscope can capture one or more images over time. Between each captured image, the computer processor may change the illumination pattern created by the patterned illumination source [180]. After capturing one or more image, the computer processor can then perform an image post-processing step that can create a final high resolution, wide FOV MCPI image reconstruction. This image reconstruction may be shown on a separate display [700]. With this general workflow in mind, we now present details about each individual component of the MCPI device.

The MCPI patterned illumination source: The patterned illumination source can illuminate the sample with light from a plurality of directions, wavelengths and/or spatial patterns. In one preferred embodiment, the patterned illumination source may consist of an array of LEDs positioned at different locations. For example, the patterned illumination source could take the form of an LED array like that used in [Ref. NPL10] (32×32 LEDs, model SMD3528, center wavelength=632 nm, 4 mm LED pitch, 150 µm active area diameter). Alternatively, a custom-designed array of any number of LEDs (anywhere from 1 to 1 million) might be used in any sort of circular, hexagonal, random or other geometric spatial arrangement, either on a flat or curved surface. The wavelength of the light emitted by the light sources can be in the range of 200 nm-2 µm. Wavelengths outside this range are also possible. Each light source may emit the same wavelength or a different wavelength of light.

In a second preferred embodiment, the patterned illumination source can consist of one or more laser sources or laser diode sources, which may remain in a stationary position or may move positions between each captured image to provide different angular or spatial patterns light to the sample. In a third preferred embodiment, one or more laser sources or laser diode sources may be sent through one or more optical fibers positioned at different locations and/or angles with respect to the sample. The light from the one or more optical fibers may reach the sample at different angular or spatial arrangements. In a fourth preferred embodiment, a spatial light modulator (SLM), wherein the spatial light modulator comprises a liquid crystal or a liquid crystal on silicon display for displaying an illumination pattern, may be used as the patterned illumination source. By changing the patterned displayed on the SLM, the illumination pattern may be changed between captured images. In a fifth preferred embodiment, a digital micromirror device may be used as the patterned illumination source, wherein one or more micromirrors oriented at a first angle to reflect light towards the sample define a particular illumination pattern, and this patterned may be changed between captured images. We refer to this general set of spatially distributed optical sources as the "patterned illumination source".

The MCPI micro-camera: A simplified cross-sectional diagram of an example micro-camera is marked as [110] in FIG. 4. Each micro-camera unit may contain one or more lenses for focusing light [120], an aperture [140], as well as a radiation detector for detecting light [130].

Figure 4:
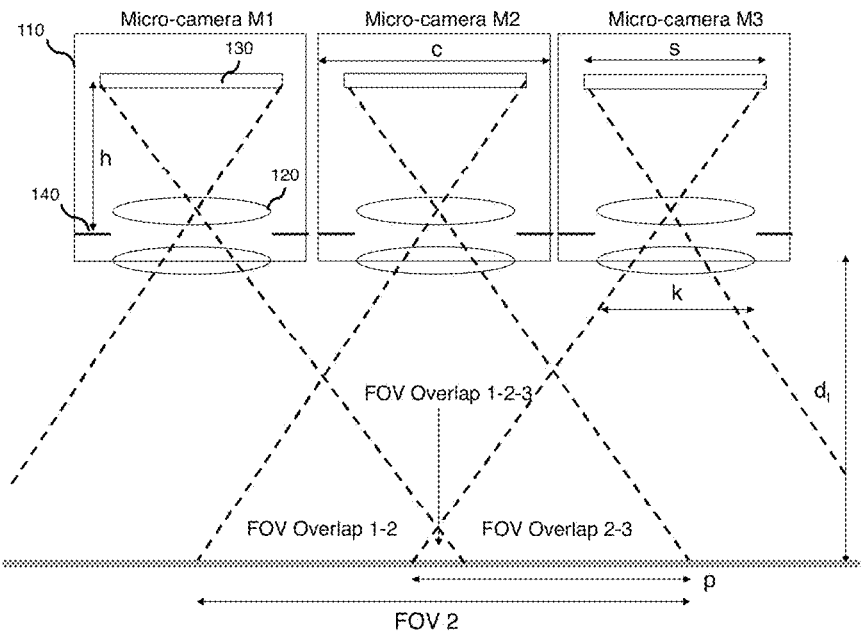
FIG. 4 is a cross-sectional side view of 3 example micro-camera units within the present micro-camera patterned illumination microscope invention

In one preferred embodiment, the radiation detector may contain 1-20 million pixels that are 0.5 µm-5 µm in size. In the diagram in FIG. 4, the one or more lenses for focusing light uses two optical elements. In one preferred embodiment, the lens system may contain two to ten optical elements, and may be designed to offer a 0.1-0.9 magnification at a sample working distance of 3-200 mm, similar to the specifications in [Ref. NPL21]. Other example lens and camera parameters, including the variables marked in FIG. 4, are presented in FIG. 10. Note that we expect the coherent resolution of this setup may be approximately 1-15 µm at the sample plane, which is similar range of resolutions available by standard 0.5×-2× objective lenses.

The MCPI micro-camera array: The MCPI micro-camera array is comprised of more than one micro-camera. In one preferred embodiment, the micro-cameras may placed adjacent to one another in a planar configuration, in which case the optical axis of all micro-cameras are parallel to one another. The MCPI micro-cameras can be arranged in either a rectangular, hexagonal, or other form of periodic grid across this flat plane. A simplified cross-sectional diagram of a micro-camera array with 3 micro-cameras in a planar configuration is shown in FIG. 4. In a second preferred embodiment, the micro-camera array may be curved, in which case the optical axis of each micro-camera is not parallel with the other micro-cameras in the array. In this configuration, the micro-cameras towards the edge of the array may be angled such that their lenses can capture more light from the sample (i.e., are pointed towards the center of the sample), to improve detection efficiency.

Examples

Light from the patterned illumination source exits the sample from many spatial locations. Some of this light may then propagate to the micro-camera array. Considering one spatial location along the sample, the light exiting this location will pass through one or more micro-camera lenses to form one or more images. In the most general arrangement, each micro-camera can image a distinct sample region to its image plane and will record the intensity of this optical field on a digital detector array (e.g., a CMOS or CCD pixel array). We also note that the micro-cameras do not necessarily have to form an exact image (e.g., can be defocused or otherwise optically modified, e.g., as by a coded aperture). We denote the area of the sample from which light has interacted with, and can then enter into micro-camera number n (here denoted as Mn), as field-of-view n (here denoted as FOVn). What makes the MCPI camera array geometry distinct from other camera arrays used for microscopy is its utilization of overlapping FOVs. That is, the same position on the sample may appear within FOV1 (for camera M1) and FOV2 (for camera M2), for example, where M1 and M2 may denote two different micro-cameras that are physically adjacent to one another. Such overlapping regions, "FOV Overlap 1-2" and "FOV Overlap 2-3", are labeled in FIG. 4.

Figure 5:
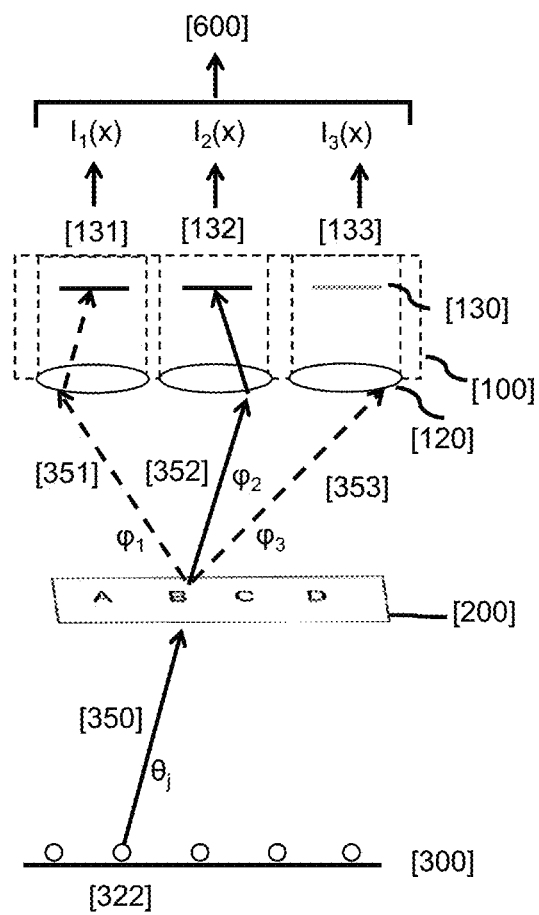
FIG. 5 is a cross-sectional side view of the present micro-camera patterned illumination microscope invention with example light rays shown.

We consider a simple example of how 3 micro-cameras image a sample in FIG. 5. Each micro-camera in the MCPI system can have a unique FOV and this FOV can overlap with the FOV of one or more adjacent cameras. Let us consider the sample location denoted by the letter "B", which is within FOV1 and FOV2 for cameras M1, labeled [131], and M2, labeled [132], but not within FOV3 for camera M3, labeled [133]. Light from the patterned illumination source, here emitting from one LED j in [322], travels at angle $\theta_j$, in [350] to illuminate this letter "B". The pattern illumination may interact with the sample and spreads into multiple directions. Here we show three possible directions as three unique rays, [351]-[353]. The direction of ray [352] ($\phi_2$) is the same as the direction of the patterned illumination ($\theta_j = \phi_2$) and contributes to the bright-field content of the image detected by the M2 camera [132], $I_2(x)$, after passing through micro-camera M2's lens. A different ray [353] travels from the same sample location at angle $\phi_3$ towards camera M3 [133]. However, since the sample location containing the "B" is not within FOV3, it will not enter camera M3 and will not reach its detector, marked as [130]. It will thus not contribute to the associated image, $I_3(x)$ [133].

The last ray [351] emerges from the sample at an angle $\phi_1$ with respect to the optical axis and towards camera M1. We assume $\phi_1$ is less than the acceptance angle $\phi_a$ of each micro-camera (where we define $\phi_a = a\,\sin(NA)$, with NA the micro-camera numerical aperture). Since we also assume the letter "B" is within FOV1, ray [351] will thus enter M1's lens and contribute to an image. However, let us also assume that in this diagram the sum of the illumination angle $\theta_j$ and the diffracted angle $\phi_1$ exceeds the lens acceptance angle: $\phi_j + \phi_1 > \phi_a$. In other words, if we were to shift the LED illumination back to normal incidence, then ray [351] would also rotate by $\theta_j$ and thus be traveling at an original angle $\theta_j + \phi_1$, which would not pass through the lens. Thus, ray [351] can contribute to the dark-field content of the M1 image in [131]. While ray [351] originates from the spatial location at the sample plane as ray [352], it contains a different type of angular information. As we detail next, the MCPI microscope can use the unique information captured by micro-cameras M1 and M2 about the same sample location (the letter "B") to improve image resolution and detect depth.

MCPI data capture: In one preferred configuration, the MCPI patterned illumination is comprised of an LED array, and the system illuminates one LED within the LED array at a time and captures a unique image from each and every micro-camera within the micro-camera array. If there are a total of N micro-cameras and J LEDs, then the MCPI system may capture and save a total of N×J unique images.

Figure 6:
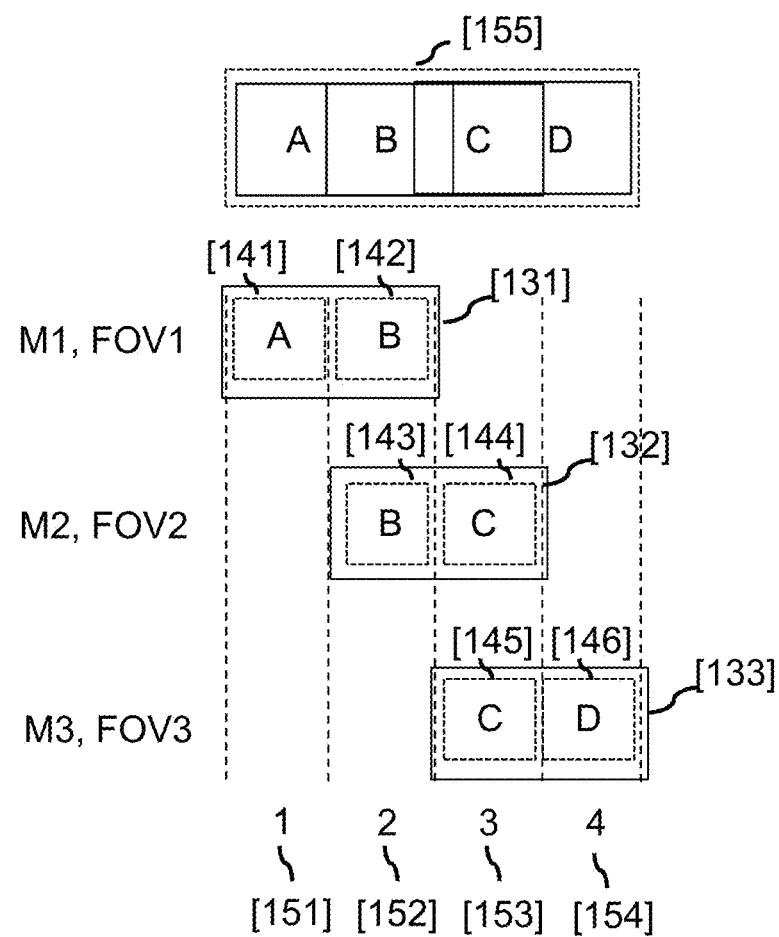
FIG. 6 is a component diagram of the field-of-view (FOV) captured by one embodiment of the present micro-camera patterned illumination microscope invention.

A useful format of MCPI data is created after additionally segmenting each captured image into V different overlapping image segments, or "patches". Patch formation is outlined in FIG. 6 and occurs in two main steps. First, The full image from each micro-camera can be aligned on a "sample plane grid" with respect to all of its neighbors. The full image from micro-camera 1 (M1) is in [131] as FOV1, the full image from micro-camera 2 (M2) is in [132] as FOV2, and the full image from micro-camera 3 (M3) is in [133] as FOV3. FOV1 contains the letters CA' and B'. CA' is in image patch 1, shown as [151], and 'B' is in image patch 2, shown in [152]. FOV2 contains the letters 'B' and 'C' in image patch 2 and image patch 3 [153], respectively. FOV3 contains 'C' and 'D' in image patch 3 and image patch 4 [154], respectively.

Images with the same feature (e.g., the letter B) are aligned with a simple image registration algorithm (e.g., a mean-squares least fit with respect to position and orientation). This alignment is commonly used to combine multiple images into on panorama image. The goal of image alignment is to ensure that the same spatial location within each image is assigned the same pixel value on a pixelated grid defined at the sample plane. For example here, the image from M2 in [132] is shifted to the left (in pixel value) until the letter B overlaps with the letter B in the image from M1 in [131]. Each pixel will receive the same sample plane grid location for e.g. the pixel containing the upper corner of the letter "B". The result of this alignment process is a composite image as shown in [155].

Once each image is aligned over the sample plane grid, the images may then be split into patches. In the example in FIG. 6, we show each image split into two patches: image [131] contains patch [141] and [142], image [132] contains patch [143] and [144], and image [133] contains patch [145] and [146]. In one preferred embodiment, these patches can overlap slightly with one another by 0-10%, and each image will be split into 4-1000 patches. For example, if each micro-camera image contains 1000×1000 pixels, a set of 10×10 patches can be formed by splitting the image into 100×100 pixel square blocks. Here, the patches will overlap by 0%. As a second example, if each micro-camera image contains 1000×1000 pixels, a set of 10×10 patches can be formed by splitting the image into 120×120 pixel square blocks. Here, the patches will overlap by greater than 0%. The patch size can be as small as 2×2 pixels, or as large as the entire image (i.e., 1000×1000 pixels in this example).

Figure 7:
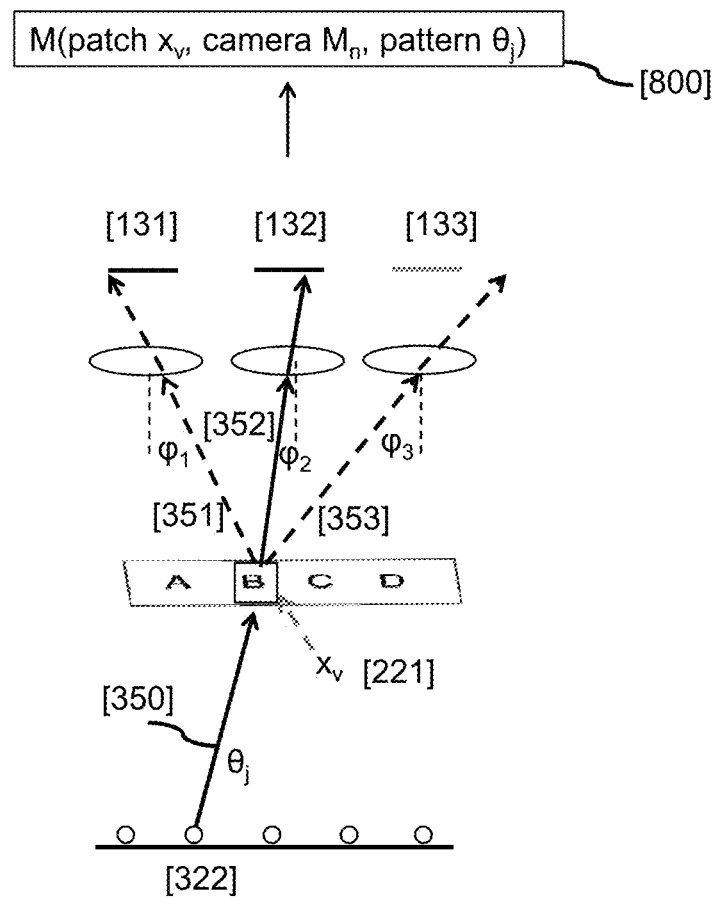
FIG. 7 is a cross-sectional side view of the present micro-camera patterned illumination microscope invention with example light rays shown.

After splitting the images into patches, the final data set for MCPI will consist of V×N×J image patches. It can be helpful to store this data set as a multi-dimensional array M, where each image patch is indexed by 3 different variables, M(v,n,j), which denotes the with image patch from the nth camera under illumination from the jth LED. Here, $1 \leq v \leq V$, $1 \leq n \leq N$ and $1 \leq j \leq J$. The array is shown as [800] in FIG. 7. In FIG. 7, we also show the same light rays [351]-[353] that emerge from the letter "B" from FIG. 5. Now, we also show how the letter "B" can be contained within one patch, labeled xv as [221]. The collection of all recorded images from all the micro-cameras after being split into patches, as well as under all forms of patterned illumination, form the dataset M [800].

Figure 8:
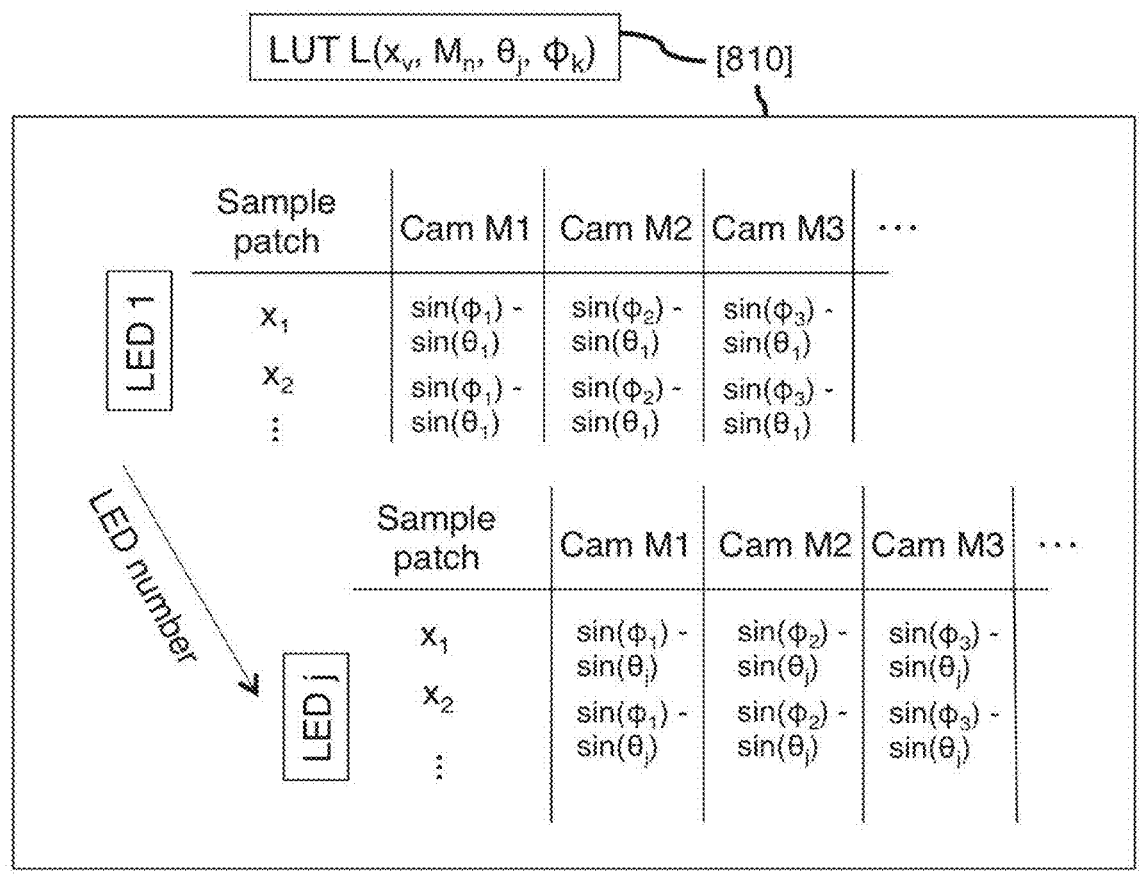
FIG. 8 is a look-up table (LUT) of an embodiment of the present micro-camera patterned illumination microscope invention.

In addition to forming the MCPI data set M, it may also be helpful and necessary to calibrate the MCPI system. In one preferred embodiment, MCPI system calibration can be achieved with a digitally saved look-up table (LUT), which here we denote with the function L(v,n,j). The LUT may also be indexed by the same three variables as the data matrix M(v,n,j). In one preferred embodiment, L(v,n,j) can store a vector denoting the difference between the sine of two (average) angles: $\sin(\phi_n) - \sin(\theta_j)$, as shown within the table marked [810] in FIG. 8. Here, $\phi_n$ is the angle between the center of sample patch v and the optical axis of the nth micro-camera, as denoted for 3 micro-cameras in FIG. 7 as [351]-[353]. Likewise, $\theta_j$ is the average angle of illumination at patch v from the jth illumination pattern.

In one preferred embodiment, the jth illumination pattern can originate from the jth LED [322], in which case we may assume this illumination acts as a plane wave, denoted by [350], across the small patch in FIG. 7. This saved vector value $\sin(\phi_n) - \sin(\theta_j)$ indicates the central wavevector $(k_x^c, k_y^c)$ of the sample optical spectrum that passes through micro-camera Mn when the sample patch v is illuminated by LED j. Specifically, it defines the amount of shift in the spatial frequency domain that should be applied to the spectrum of sample patch $u_2(x, y)$ (which we will call $\hat{u}_2(k_x, k_y)$) to align it to the aperture function of micro-camera Mn, which we call $a(k_x, k_y)$ and is centered at $(k_x=0, k_y=0)$. The LUT can allow us to efficiently compute the aperture-spectrum product $\hat{u}_2(k_x - \sin(\phi_{nx}) - \sin(\theta_{jx}), k_y - \sin(\phi_{ny}) - \sin(\theta_{jy})) * a(k_x, k_y)$ for any or all of the N micro-cameras within the micro-camera array. In one preferred embodiment, the calibration LUT table can be pre-computed for a given MCPI setup's camera-LED geometry. In a second preferred embodiment, the calibration LUT can be measured in a pre-calibration process. If multiple types of patterned illumination are used with the MCPI system, then it can be helpful to pre-compute and/or measure and then subsequently save multiple different LUT for use by the MCPI post-processing algorithm.

MCPI data post-processing: A component diagram of one preferred embodiment of the MCPI image post-processing workflow is in FIG. 9. The MCPI data matrix M and a calibration LUT L can serve as input to the MCPI post-processing workflow. The output of the workflow is a final image reconstruction with improved spatial resolution. In one preferred embodiment, this output may also include a measurement of depth at different spatial locations across the image. In another preferred embodiment, the output also includes a measurement of the optical phase at different spatial locations across the image. In another preferred embodiment, the output also includes a measurement of multi-spectral content at different spatial locations across the image.

Figure 9:
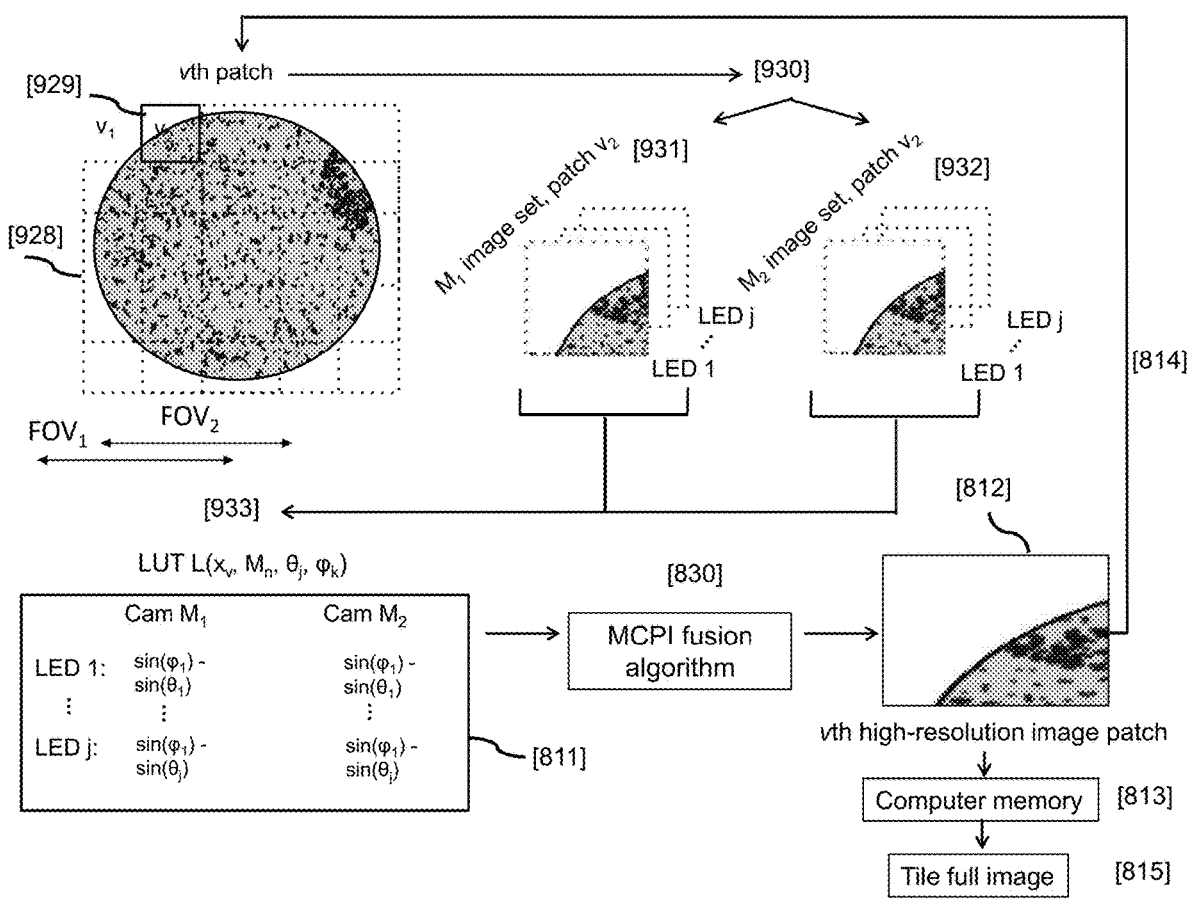
FIG. 9 is a component diagram of the image formation process for one embodiment of the present micro-camera patterned illumination microscope invention.

In the first step of the workflow, image patches may be formed as described in the previous section. First, the images from all of the micro-cameras are spatially aligned over a complete sample plane grid. In one preferred embodiment, spatial alignment ensures that the same sample features in each image set occupy the same pixel locations along the sample plane grid. Then, the sample plane grid is split into a desired number of V image patches. In FIG. 9, [928] shows an example image of a full petri dish, overlaid with an example sample plane grid that denotes how to split up the image into multiple patches (small squares), marked $v_1$, $v_2$, etc. The with patch is imaged by one or more micro-camera. In FIG. 9, patch $v_2$, marked [929], is imaged by two micro-cameras (e.g., is in FOV1 from micro-camera M1 and FOV2 from micro-camera M2.

In the second workflow step, each patch can be considered one at a time. In step [930], we consider image patch v=2. Here, we see that 2 micro-cameras, M1 and M2, contain patch v=2 within their FOV. We term the collection of images associated with one patch area from one micro-camera an "image group". For example, to form one image group [931], we, ay select the set of all images from micro-camera M1 from the data matrix: M(v=2, n=1, j=1 to J). To form another image group [932] associated with micro-camera M2, we may select the images from the dataset with M(v=2, n=2, j=1 to J). For each image group, we may also select the central wavevector associated with each image from the LUT in step [933]. For image group 1 we may select L(v=2, n=1, j=1 to J), and for image group 2 we may select L(v=2, n=2, j=1 to J), for example. These two sets of values are both in the table marked [811]. Next, for a particular image patch, we may input the associated image groups and LUT values into MCPI algorithm. For example, for image patch v=2, we input M(v=2, n=1 to 2, j=1 to J) and L(v=2, n=1 to 2, j=1 to J) into the MCPI fusion algorithm (described in the next section). The output of the MCPI fusion algorithm can then be a high-resolution image of sample patch v=2, containing both its amplitude and phase content, as shown in [812], which is saved in computer memory [813]. This workflow is repeated for all image patches, as denoted by the iteration arrow in [814]. In one preferred embodiment, this workflow can be performed in parallel for all image patches to improve computation time. Finally, the high-resolution outputs for all of the image patches can then tiled together to form a final MCPI high-resolution image as shown in [815].

MCPI fusion algorithm: The MCPI fusion algorithm may be designed to use a set of measurements in M and the LUT values in L as input. These measurements and LUT values may be associated with the patterned illumination for the vth image patch as input. In one preferred embodiment, the MCPI fusion algorithm computes a reconstruction of the vth image patch with a resolution that is higher than that defined by the diffraction limit of its imaging lenses (e.g. from 5 µm to 1 µm or less, or from 15 µm to 8 µm or less). In a second preferred embodiment, the MCPI fusion algorithm may additionally compute a depth map of the vth image patch. In a third preferred embodiment, the MCPI fusion algorithm can also compute the phase of the light at the sample plane. In a fourth preferred embodiment, the MCPI algorithm may also compute the multi-spectral content of the sample.

Continuing with our example for image patch v=2, the input to the MCPI fusion algorithm can be M(v=2, n=1 to 2, j=1 to J) and L(v=2, n=1 to 2, j=1 to J). Here, for example, M includes two image sets (M1 and M2) that each contain J uniquely illuminated images. In general M can contain anywhere from 2 to 1000 image sets per patch, and anywhere from 1 to 10,000 uniquely illuminated images per image set. Due to their different spatial locations with respect to the sample, each image set may contain unique angular information about each sample patch within their shared FOV. Furthermore, each image under patterned illumination may also cause different spatial and angular information to reach the sensor.

In general, if we describe the sample in three dimensions by a complex function S(x,y,z) and we assume the optical field that interacts with the sample and the MCPI system behaves in a linear manner, then we may describe the process of image formation through an equation to solve for S(x,y,z). In one preferred embodiment, we may convert the data matrix $M_v$ associated with the images collected with respect to one patch v into a vector $m_v$=vec[$M_v$], which contains all pixels detected by the MCPI system for the vth sample patch. Here, the vec[ ] operation transforms any n-dimensional array into a vector. Furthermore, we may consider the vth patch of the sample as $S_v$(x,y,z), and then attempt to reconstruct $s_v$=vec[$S_v$] using the following matrix equation that describes the MCPI image formation process:

$$m_v = |T_v s_v|^2 + n \quad \text{(Equation 1)}$$

Here, the absolute value squaring is due to the ability to only detect intensity with the detector at the sample plane, and n is a vector of additive noise. $T_v$ is a "system matrix" that describes the MCPI image formation process for the vth patch. It may be determined from the geometry of the MCPI setup, the LUT for the vth patch L(v=2, n=1 to 2, j=1 to J), or any other type of calibration process. Using the known variables $m_v$ and $T_v$, the goal of the MCPI fusion algorithm may then be to determine $s_v$ by solving an inverse problem. One general form of this inverse problem is to minimize the mean-squared error between the measured magnitudes and an estimate of the complex-valued high-resolution sample patch:

$$\text{Minimize } \|\sqrt{m_v} - |T_v s_v|\|^2 \text{ with respect to } s_v \quad \text{(Equation 2)}$$

Another general form is to minimize a related negative log-likelihood function, which is based on a Poisson noise prior. Equation 2 is a very standard mathematical problem that can be thought of as a cost function. There are a number of algorithms available to minimize this cost function. In one preferred embodiment of the MCPI algorithm, an alternating minimization-type strategy may be adopted to solve for the missing phase of each patch to minimize Equation 2, for example using the Douglas-Rachford algorithm.

In a second preferred embodiment, it is possible to solve the minimization problem in Equation 2 by constructing an Augmented Lagrangian and then minimizing the Augmented Lagrangian with gradient descent. In a third preferred embodiment, it is possible to solve Equation 2 using an iterative optimization strategy that first determines the gradients of Equation 2, or the gradients and the Hessians of Equation 2, and then applying a Gauss-Newton method, somewhat similar to the methods in [Ref. NPL24]. In a fourth preferred embodiment, the sample may be fluorescent and $s_v$ may be a real, positive-valued function, and a minimization method similar to those used in structured illumination fluorescent microscopes to determine a high-resolution sample may be used (e.g., an algorithm similar to one of the minimization methods used in [Ref NPL16] may be applied).

The MCPI fusion algorithm can use any or all of these strategies to produce an estimate of the high-resolution sample, $s_v$. As shown in FIG. 9, the invention may perform the MCPI fusion algorithm in sequence or in parallel for all image patches to produce a set of final high-resolution image reconstructions, each for a separate patch. These reconstructions may also include an estimate of the sample height, and/or the sample phase, and or its spectral color content. Finally, these separate patches may be combined together using an image stitching algorithm to produce a final, large, high-resolution image reconstruction that can be digitally saved and/or shown on a display.

INDUSTRIAL APPLICABILITY

The invention has been explained in the context of several embodiments already mentioned above. There are a number of commercial and industrial advantages to the invention that have been demonstrated, including the ability to image an unbounded FOV at high resolution with a compact, lightweight, and non-moving system. The invention also provides in varying embodiments additional commercial benefits like high throughput, 3D images, multi-spectral analysis and dark-field images, to name a few.

While the invention was explained above with reference to the aforementioned embodiments, it is clear that the invention is not restricted to only these embodiments, but comprises all possible embodiments within the spirit and scope of the inventive thought and the following patent claims.

CITATION LIST

Patent Literature

[PTL1]: K. Schuster, Projection objective for microlithography, U.S. Pat. No. 6,801,364
[PTL2]: Nikon Corporation, Projection optical system and projection exposure apparatus, U.S. Pat. No. 5,805,344
[PTL3]: K. C. Johnson, "Microlens scanner for microlithography and wide-field confocal microscopy," U.S. Pat. No. 6,133,986 (2000).

[PTL4]: C. F. Bevis et al., "System for inspection of patterned or unpatterned wafers and other specimen," US Patent App. US2004/0246476 A1

[PTL5]: S. K. Case et al., "High speed optical inspection system with camera array and compact, integrated illuminator," US Patent App. US2011/0069878 A1

[PTL6]: E. Rosengaus et al., "System and method for inspecting semiconductor wafers," U.S. Pat. No. 6,020,957 (2000).

[PTL7]: R. Horstmeyer et al, Aperture Scanning Fourier Ptychographic Imaging. US Patent Application US20150036038 A1 (2015).

[PTL8]: X. Ou et al., Embedded Pupil Function Recovery for Fourier Ptychographic Imaging Devices. US Patent Application US20150160450 (2015).

[PTL9]: R. Horstmeyer et al., Variable Illumination Fourier Ptychographic Imaging Systems, Devices, and Methods. US Patent Application US20150054979 A1 (2015)

What is claimed is:

1. A microscope comprising
    a plurality of micro-camera units,
        wherein the plurality of micro-camera units is configured so that at least a first micro-camera unit of the plurality of micro-camera units is defocusable on a focal plane defined by at least a second micro-camera unit of the plurality of micro-camera units,
        wherein each micro-camera unit of the plurality of micro-camera units is configured to directly capture one or more images of a region of a sample;
    multiple optical sources;
    a processor,
        wherein the processor is configured to control the multiple optical sources to create multiple optical illumination patterns at the sample,
        wherein the processor is configured to control the plurality of micro-camera units for each micro-camera unit of the plurality of micro-camera units to capture images of a same region of the sample under at least two separate optical illumination patterns of the multiple optical illumination patterns.

2. The microscope of claim 1, further comprising
    at least another microscope located adjacent to the microscope,
    wherein the at least another microscope and the microscope are configured to form an extended microscope system.

3. The microscope of claim 1,
    wherein at least a micro-camera unit is configured to capture images of a partially overlapped region with at least another micro-camera unit.

4. The microscope of claim 1,
    wherein at least a region of the sample imaged by a micro-camera unit partially overlaps with one or more regions of the sample imaged by at least another micro-camera unit.

5. The microscope of claim 1,
    wherein the multiple optical sources is located on the same side of the sample with respect to the plurality of micro-camera units, or
    wherein the multiple optical sources is located on the opposite side of the sample with respect to the plurality of micro-camera units, or
    wherein the multiple optical sources comprise first optical sources on the same side of the sample with respect to the plurality of micro-camera units, and second optical sources located on the opposite side of the sample with respect to the plurality of micro-camera units.

6. The microscope of claim 1,
    wherein the multiple optical sources comprise light sources configured to generate light having different optical wavelengths.

7. The microscope of claim 1,
    wherein the processor is further configured to generate height information of the sample at one or more spatial locations based on optical phases determined from the at least two separate optical illumination patterns.

8. The microscope of claim 1,
    wherein the processor is configured to digitally combine the images acquired by the micro-camera units to also provide a measure of the multi-spectral content of the sample at one or more spatial locations.

9. The microscope of claim 1,
    wherein the processor is configured to process the images captured by the micro-camera units into an image reconstruction of the sample with a higher image resolution than any single one of the micro-camera units based on optical phases determined from the at least two separate optical illumination patterns.

10. A microscope comprising
    a plurality of micro-camera units,
        wherein each micro-camera unit of the plurality of micro-camera units is configured to directly capture one or more images of a distinct region of a sample;
    multiple optical sources;
    a processor,
        wherein the processor is configured to control the multiple optical sources to create multiple optical illumination patterns at the sample,
        wherein the processor is configured to control the plurality of micro-camera units for each micro-camera unit of the plurality of micro-camera units to capture images of a same region of the sample under at least two separate optical illumination patterns of the multiple optical illumination patterns.

11. The microscope of claim 10,
    wherein the micro-camera units are arranged in a geometric array, with each micro-camera unit placed immediately adjacent to at least another micro-camera unit.

12. The microscope of claim 10,
    wherein the one or more optical sources comprise light sources configured to generate light having different optical wavelengths.

13. The microscope of claim 10,
    wherein the processor is configured to simultaneously reconstruct at least one of a measure of sample depth based on optical phases determined from the at least two separate optical illumination patterns, a measure of multi-spectral property of the sample, an image reconstruction of the sample with a higher image resolution than any single one of the micro-camera units based on optical phases determined from the at least two separate optical illumination patterns, or an optical phase of the sample while forming an image reconstruction of the sample based on optical phases determined from the at least two separate optical illumination patterns.

14. The microscope of claim 10,
    wherein the multiple optical sources is located on the same side of the sample with respect to the plurality of micro-camera units.

15. The microscope of claim 10,
    wherein the multiple optical sources is located on the opposite side of the sample with respect to the plurality of micro-camera units.

16. The microscope of claim 10,
wherein the multiple optical sources comprise first optical sources on the same side of the sample with respect to the plurality of micro-camera units, and second optical sources located on the opposite side of the sample with respect to the plurality of micro-camera units.

17. A microscope comprising
a plurality of micro-camera units,
   wherein micro-camera units of the plurality of micro-camera units are arranged in a curved surface,
   wherein each micro-camera unit of the plurality of micro-camera units is configured to directly capture one or more images of a region of a sample;
multiple optical sources;
a processor,
   wherein the processor is configured to control the multiple optical sources to create multiple optical illumination patterns at the sample,
   wherein the processor is configured to control the plurality of micro-camera units for each micro-camera unit of the plurality of micro-camera units to capture images of a same region of the sample under at least two separate optical illumination patterns of the multiple optical illumination patterns.

18. The microscope of claim 17,
wherein at least a micro-camera unit is configured to capture images of a partially overlapped region with at least another micro-camera unit.

19. The microscope of claim 17,
wherein at least a region of the sample imaged by a micro-camera unit partially overlaps with one or more regions of the sample imaged by at least another micro-camera unit,
wherein field-of-view (FOV) of each micro-camera unit overlaps between 5% to 90% with FOV of one or more micro-camera units that are immediately adjacent to the each micro-camera unit.

20. The microscope of claim 17,
wherein the processor is configured to simultaneously reconstruct at least one of a measure of sample depth, a measure of multi-spectral property of the sample, an image reconstruction of the sample with a higher image resolution than any single one of the micro-camera units, or an optical phase of the sample while forming an image reconstruction of the sample,
wherein the image reconstruction of the sample is formed by processing the images captured by the micro-camera units based on optical phases determined from the at least two separate optical illumination patterns.

* * * * *